(12) United States Patent
Reinemuth

(10) Patent No.: US 6,402,361 B1
(45) Date of Patent: Jun. 11, 2002

(54) CHARGING ASSEMBLY FOR MIXING VESSEL

(75) Inventor: Jurgen Reinemuth, Weinheim (DE)

(73) Assignee: Pfaudler-Werke GmbH, Schwetzingen (DE)

( * ) Notice: Subject to any disclaimer, the term of this patent is extended or adjusted under 35 U.S.C. 154(b) by 0 days.

(21) Appl. No.: 09/574,287

(22) Filed: May 19, 2000

(30) Foreign Application Priority Data

Jun. 15, 1999 (EP) .............................................. 99111607

(51) Int. Cl.[7] .............................. B01F 7/16; B01F 15/02
(52) U.S. Cl. ........................ 366/136; 366/245; 366/331; 366/165.1
(58) Field of Search ........................ 366/242, 244–250, 366/251, 252, 331, 347, 168.1, 167.1, 136, 137, 169.1, 169.2

(56) References Cited

U.S. PATENT DOCUMENTS

| | | | |
|---|---|---|---|
| 1,947,851 A | * | 2/1934 | Jewett |
| 2,042,818 A | * | 6/1936 | Allen et al. |
| 2,226,470 A | | 12/1940 | McGuffee .................. 366/343 |
| 2,347,195 A | * | 4/1944 | Huff |
| 2,375,558 A | * | 5/1945 | Hutchinson |
| 2,391,858 A | * | 1/1946 | Auer |
| 2,392,542 A | | 1/1946 | Matuszak ................ 366/169.2 |
| 2,435,884 A | * | 2/1948 | Galewski |
| 2,801,083 A | * | 7/1957 | Balassa |
| 2,826,401 A | * | 3/1958 | Peters |
| 3,355,106 A | * | 11/1967 | Grahm |
| 3,584,840 A | | 6/1971 | Fuchs ...................... 366/169.1 |
| 4,249,828 A | * | 2/1981 | Condolios |
| 4,767,217 A | * | 8/1988 | Van den Brink et al. |
| 4,834,542 A | * | 5/1989 | Sherwood |
| 4,883,363 A | * | 11/1989 | Pillon et al. |
| 5,334,496 A | * | 8/1994 | Pond et al. |
| 5,403,088 A | * | 4/1995 | Killmer et al. |
| 5,427,450 A | * | 6/1995 | Gambrill |
| 6,024,481 A | * | 2/2000 | Hilstrom et al. |

FOREIGN PATENT DOCUMENTS

| | | |
|---|---|---|
| BE | 721313 | 11/1968 |
| DE | 38 08 154 | 9/1989 |
| FR | 1037412 | 4/1953 |
| GB | 548664 | 10/1942 |

* cited by examiner

Primary Examiner—Tony G. Soohoo
(74) Attorney, Agent, or Firm—Michael L. Dunn

(57) ABSTRACT

A charging assembly is provided for introducing a product into a mixing vessel of the type comprising a stirring mechanism having a drive shaft (1) into the vessel through a top port (3). An agitator (7) is connected to the lower end of the drive shaft (1) and driving means (20) are provided on the upper end of the drive shaft (1). An adapter element (10) is disposed between the driving means (20) and top port (3) so as to surround an upper portion (1*a*) of the drive shaft (1). The adapter element (10) includes at least one inlet port (11) for introducing said product into an annular space (13) defined between the adapter element (10) and the drive shaft (1).

29 Claims, 7 Drawing Sheets

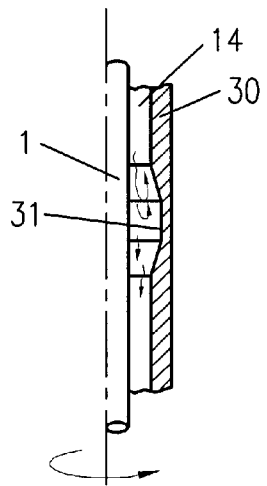 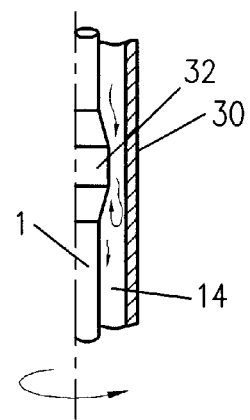 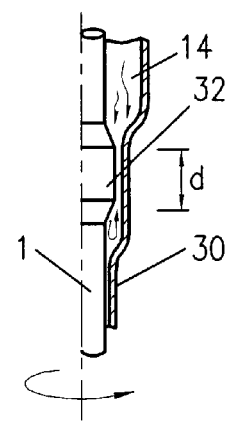
FIG. 5a      FIG. 5b      FIG. 5c
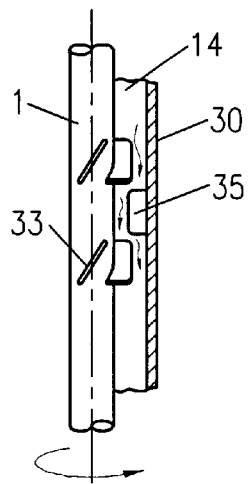 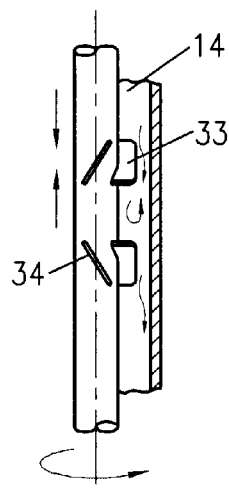 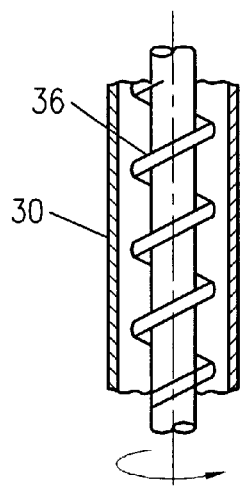
FIG. 6a      FIG. 6b      FIG. 6b

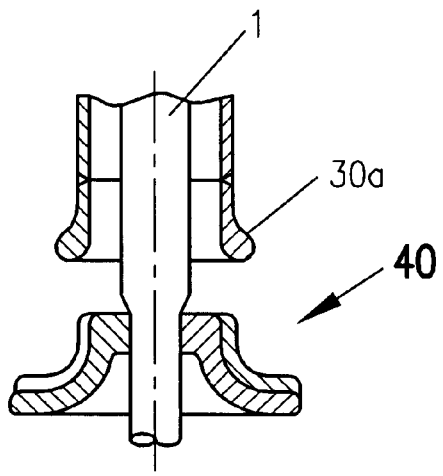
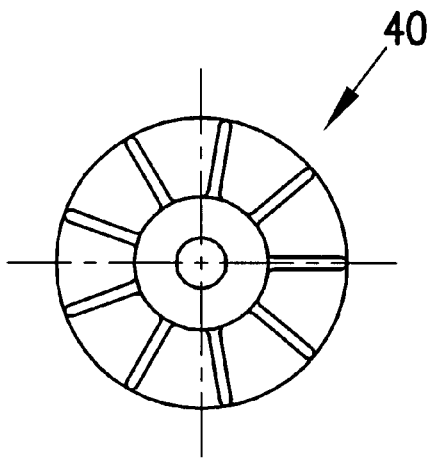
FIG. 7a       FIG. 7b
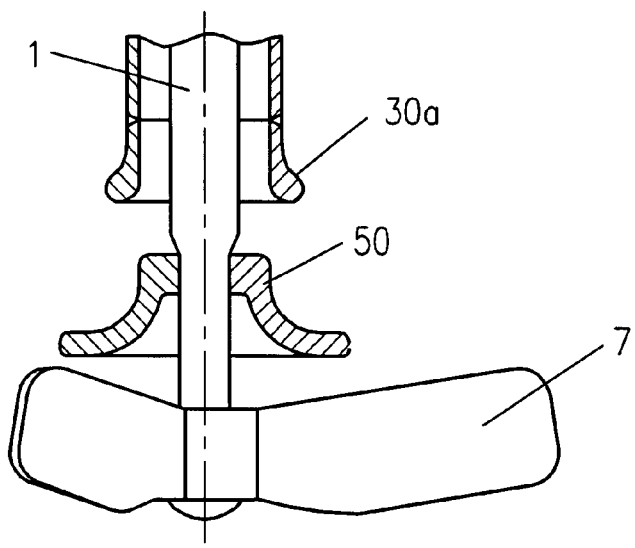
FIG. 8

CHARGING ASSEMBLY FOR MIXING VESSEL

BACKGROUND OF THE INVENTION a) Field of the Invention

The present invention relates to a charging assembly for introducing a product, especially a fluid, into a mixing vessel. The invention further relates to a mixing vessel comprising such a charging vessel in various configurations.

b) Background Art

Mixing or reactor vessels are used predominantly in the chemical and pharmaceutical industries for various operations including reacting or mixing ingredients. The ingredients can be mixed, heated, emulsified, suspended or subjected to gasification. A conventional standard vessel is shown in FIG. 1 which comprises a single stirring element or agitator 7 connected to a drive shaft 1. The drive shaft 1 is disposed along the center axis of the vessel and is set in rotary motion via driving means 20. The driving means normally comprises a motor 8 connected via a transmission 9 to the drive-shaft 1. Such reactor vessels also often include a baffle assembly 4 provided to cause flow disruption to improve mixing. Such vessels are often designed to have a glass or enamel coating on all components exposed to the materials being processed. The glass coating ensures protection against potentially corrosive or abrasive ingredients.

A problem associated with such vessels, especially vessels of smaller size, is that the number of ports required for any given process is not sufficient. This is particularly the case for glass-coated vessels. The coating process requires the ports to protect from the vessel taking up more space as compared to conventional inset ports commonly used in the construction of steel or refined steel containers. In addition, compared to steel vessels, it is much more difficult to provide additional ports in the cylindrical portion of a glass-coated vessel. It is therefore the object of the present invention to provide an improved mixing vessel with additional charging means.

BRIEF DESCRIPTION OF THE INVENTION

According to the present invention, a novel charging assembly for introducing a fluid product into a mixing vessel is provided. In addition, mixing vessels are provided which make use of the charging assembly.

The charging assembly comprises a stirring mechanism which includes a drive shaft extending into the vessel from above through a top port. An agitator is connected to the lower end of the drive shaft, which is actuated by driving means connected to the upper end of the drive shaft and disposed above the top port of the vessel. According to the invention, an adapter element is connected between the driving means and the top port and is disposed about an upper portion of the drive shaft extending out of the vessel. The adapter element surrounds the drive shaft to create an annular space therebetween. The adapter element further comprises at least one inlet port for introducing a product into the annular space along the drive shaft and thereafter into the vessel. The adapter may also comprise connections for the provision of sensors, control devices, viewing ports, etc.

In a preferred embodiment, the charging assembly further comprises a feed tube connected to the top port, which extends downwardly about the drive shaft toward the direction of the agitator. The feed tube and the drive shaft are arranged along a common axis and define an annular passage therebetween, which is in fluid communication with the annular space of the adapter. The length of the feed tube is selected such that it ends in the region above the agitator. The spacing between the end of the tube and the agitator can be selected depending on the process requirements.

The provision of the adapter element integrated into the conventional stirring mechanism allows for an additional inlet port at the top of the vessel. Apart from increasing the length of the drive shaft, no alterations are necessary to the conventional stirring mechanism. The adapter element can be easily retro-fitted into existing vessels thereby providing an additional input port.

Further advantages are achieved by feeding the charged product along the drive shaft in downwards direction and directly onto the agitator. The product to be added is supplied to the higher energy mixing zone in the vicinity of the agitator. This allows shorter mixing times and is particularly advantageous when the ingredients to be mixed have different viscosities. By introducing the product directly to the agitator, it is also possible in some instances to do away with the conventional disruption baffle.

Further objects and advantages of the present invention will become apparent in the following description of preferred embodiments taken in conjunction with the drawings.

BRIEF DESCRIPTION OF THE DRAWINGS

FIG. 5a illustrates a configuration of the annular space between the drive shaft and the feed tube;

FIG. 5b illustrates a configuration of the annular space between the drive shaft and the feed tube;

FIG. 5c illustrates a configuration of the annular space between the drive shaft and the feed tube;

FIG. 6a illustrates an embodiment of a portion of the drive shaft passing through the annular space;

FIG. 6b illustrates an embodiment of a portion of the drive shaft passing through the annular space;

FIG. 6c illustrates an embodiment of a portion of the drive shaft passing through the annular space;

FIG. 7a illustrates a cross-sectional elevational view of a mixing element which may be used in a further embodiment of the charging assembly;

FIG. 7b illustrates a top v view of the element of FIG. 7a;

FIG. 8 illustrates a further embodiment with a another type of mixing element;

DETAILED DESCRIPTION OF THE INVENTION

Figure 2:
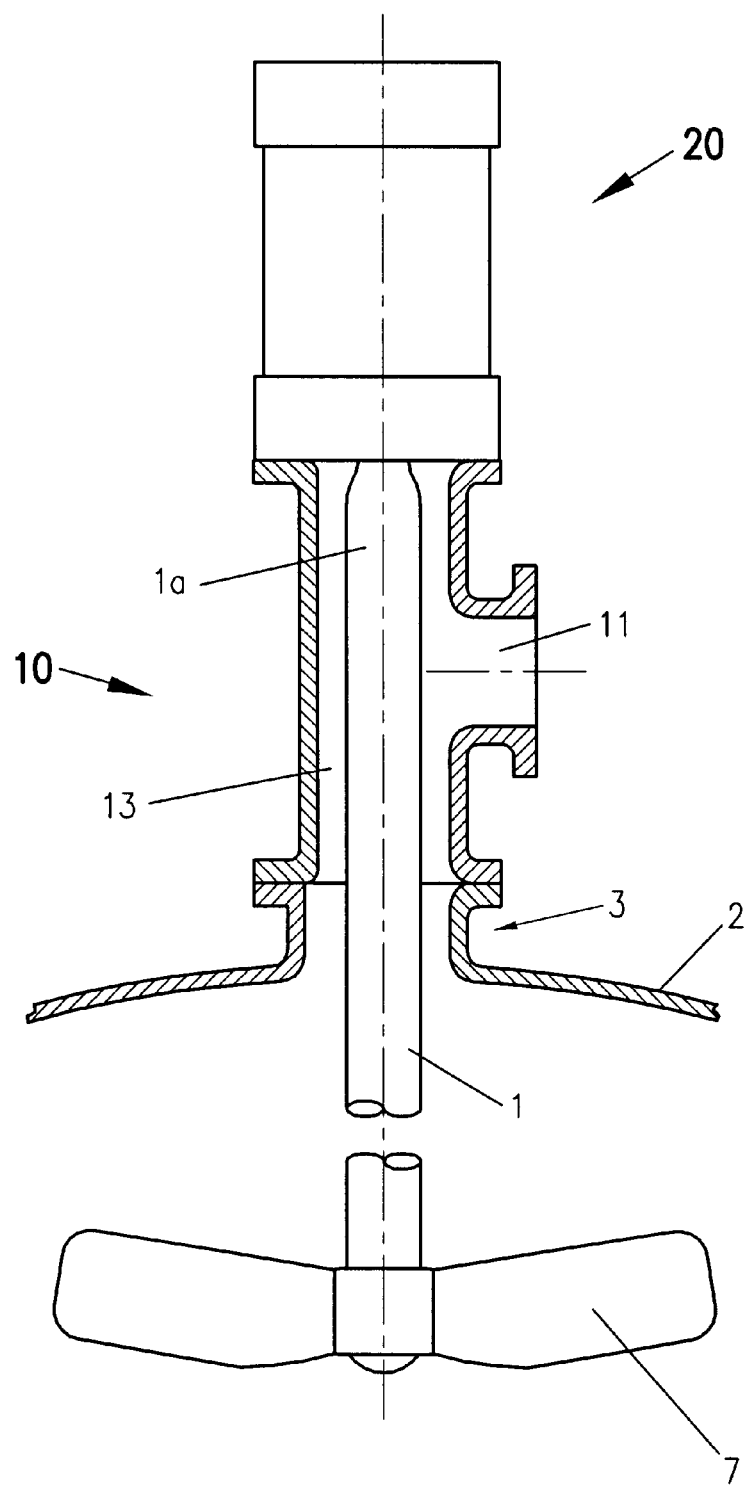
FIG. 2 gives a cross-sectional view of an embodiment of the charging assembly of the present invention.

Referring to FIG. 2, a first embodiment of the charging assembly will now be described. The stirring mechanism comprises conventional components which include a driving means 20 connected to a drive shaft 1, the drive shaft having an agitator 7 connected to its lower end. As illustrated in the embodiment of FIG. 2, the drive mechanism is connected to a top port 3 provided in the vessel 2. In the present embodiment, an adapter element 10 is connected between the driving means 20 and the top port 3. The adapter element 10 is dimensioned to coaxially surround the upper portion 1a of the drive shaft 1 to thereby form an annular space 13 therebetween. The adapter element 10 is provided with an inlet port 11 for introducing a product into the annular space 13, along the drive shaft 1 and into the vessel 2.

The embodiment of FIG. 2 as well as FIG. 3 to be discussed below comprise a single inlet port 11. It is understood however, that the adapter element 10 may have two or more inlet ports depending on the requirements of the particular process, for example to introduce two or more types of materials. It is also understood that the product or material being introduced need not be a fluid, but could also comprise a gas, a powder or paste.

Figure 1:
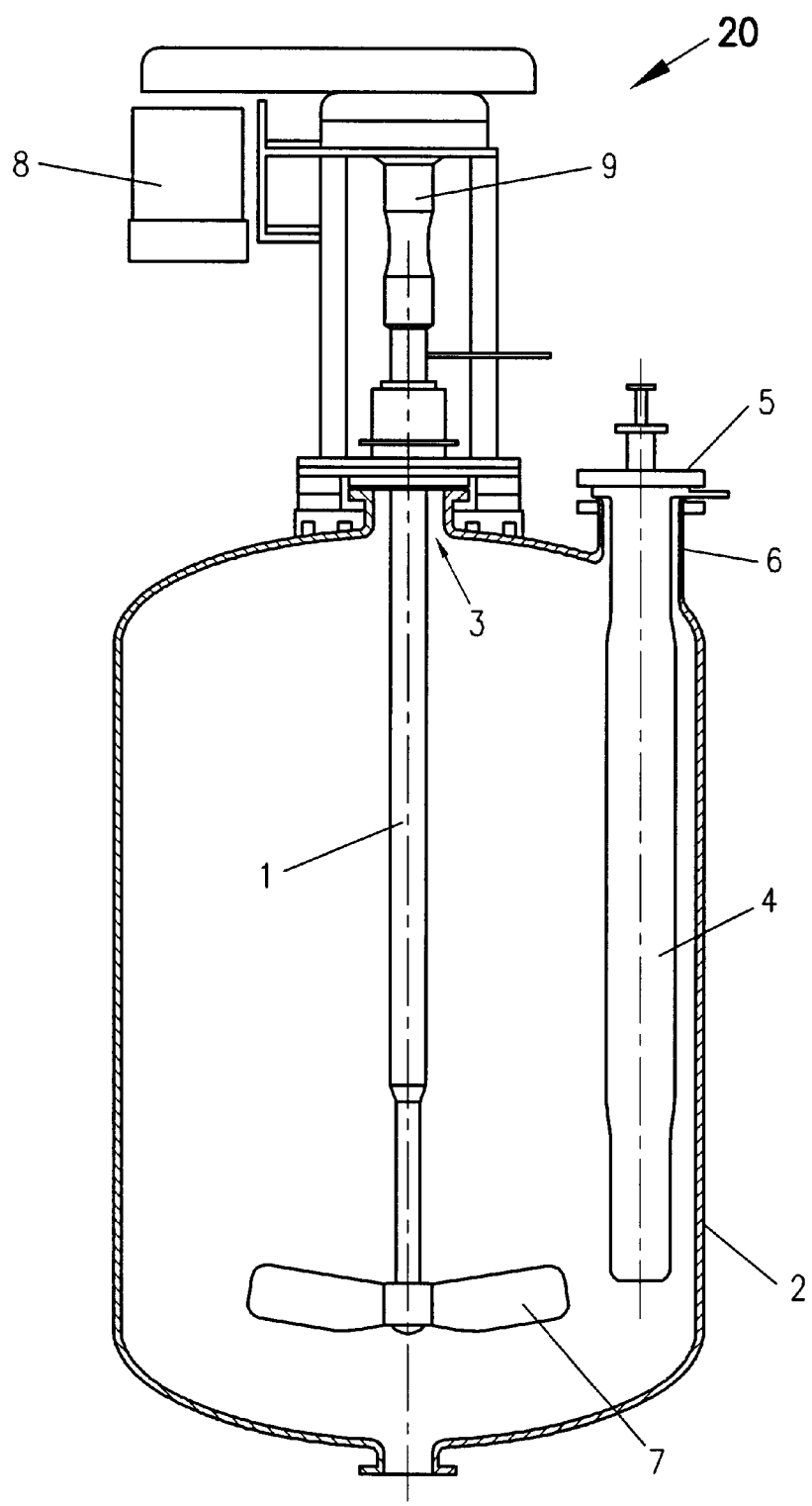
FIG. 1 illustrates an elevated cross-sectional view of a conventional mixing vessel with a stirring mechanism and a disruption baffle.

By comparison to the conventional arrangement of FIG. 1, it is apparent that the adapter element 10 can be retrofitted into existing containers, where the upper and lower connection flanges of the adapter element need only be compatible with the existing flange connections. A retro-fitting operation could require a longer drive shaft in some cases. As can be seen in FIG. 2 however the axial length of the adapter element 10 can be variably selected. Preferably, the axial length is selected to be as small as possible, while still allowing the provision of a sufficiently dimensioned inlet port or inlet ports.

Figure 3:
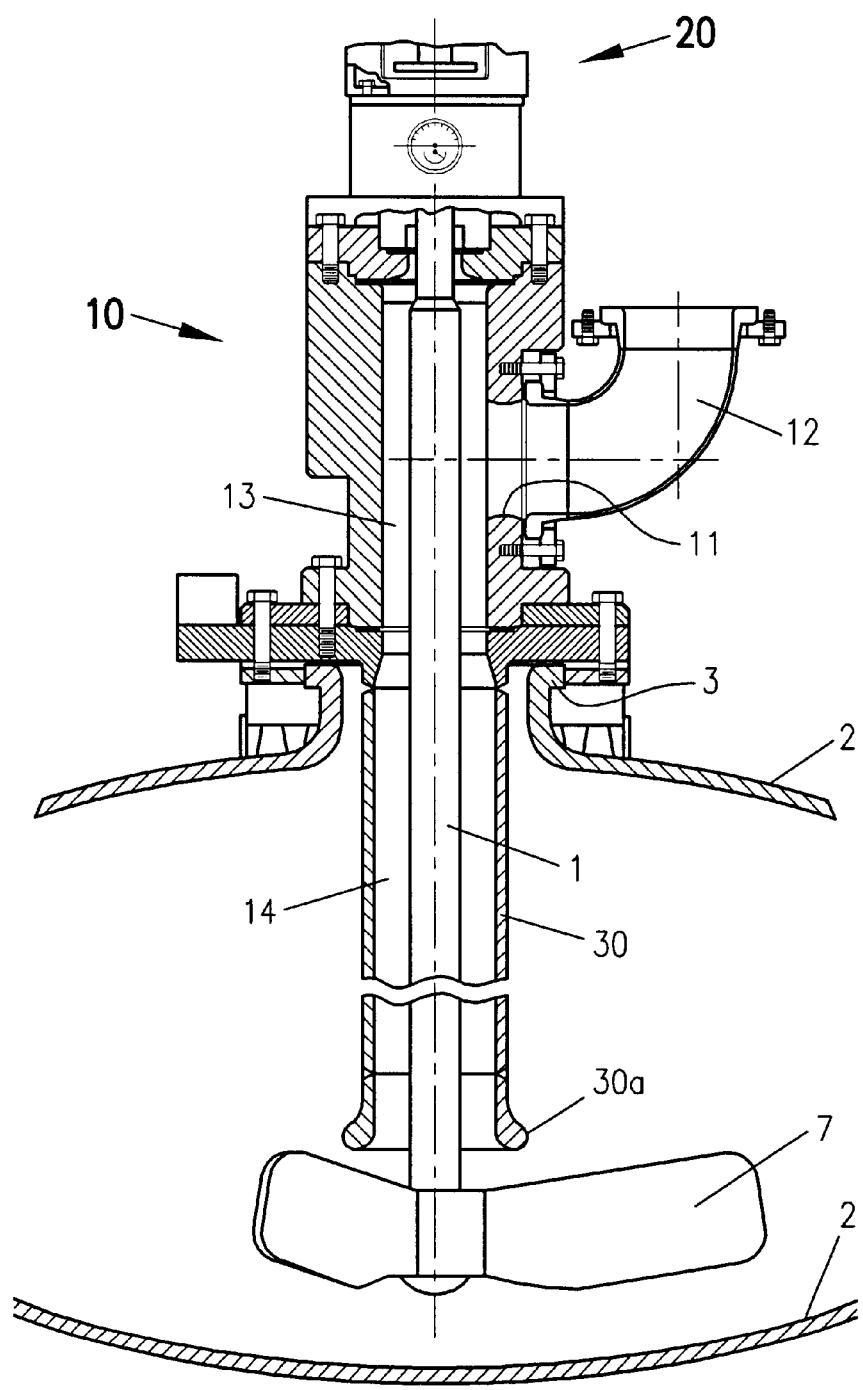
FIG. 3 gives a detailed cross-sectional view of a further embodiment of the charging assembly of the invention.

Another embodiment of the charging mechanism is shown in FIG. 3. In this embodiment, an inlet port 11 is formed as a flat opening on the outer surface of the adapter element 10. It will be understood that any particular configuration of the inlet port 11 may be chosen as long as the required material supply is guaranteed. An elbow piece 12 is connected to the inlet port to allow product supply from above. The embodiment of FIG. 3 is further provided with a feed tube 30 which is secured at its upper end between the top port 3 of the vessel 2 and the adapter element 10. The tube 30 extends downwardly in the direction of the agitator 7. An annular passage 14 is formed between the feed tube 30 and the drive shaft 1, which is in fluid communication with the annular space 13 defined by the adapter element 10. The axial length of the feed tube can be variably selected. As seen in FIG. 3, the lower outlet end 30a of the feed tube 30 is located at a distance from the agitator. The point of introduction or the spacing of the inlet end 30a with respect to the agitator 7 will vary depending on the materials being processed and the process requirements. The introduction of the product close to the agitation zone is advantageous when the components to be dispersed have different densities, for example, in the formation of emulsions or when the product in the vessel is to be gasified by a gas fluid flow through the charging assembly.

Both of the embodiments of FIGS. 2 and 3 have the advantages of introducing the fluid product in the area of low flow velocity along the drive shaft of the stirring mechanism. The flow pattern within the vessel as well as the load on the agitator is not disturbed, which in some instances is desirable. A further advantage is that the feed tube is only minimally subject to bending moments arising from the fluid flow within the vessel. It will be understood that the "feed" tube can also be used in reverse flow to withdraw product from the vessel, for example in connection with a sample taking device. Such a device can be connected to the "inlet" port 11 and adapted to remove a sample for purposes of testing and process control.

Furthermore, the feed tube can be adapted to carry other measuring devices, for example, temperature sensors, pH electrodes, means for monitoring the enamel coating, etc. The feed tube 30 shown in FIG. 3 is illustrated as being a single-walled tube. When sensors or measuring devices are employed, the feed tube will preferably be double-walled, so that an annular space is defined between the two walls. This space can be conveniently employed for the placement of sensors and/or other measuring devices.

Figure 4:
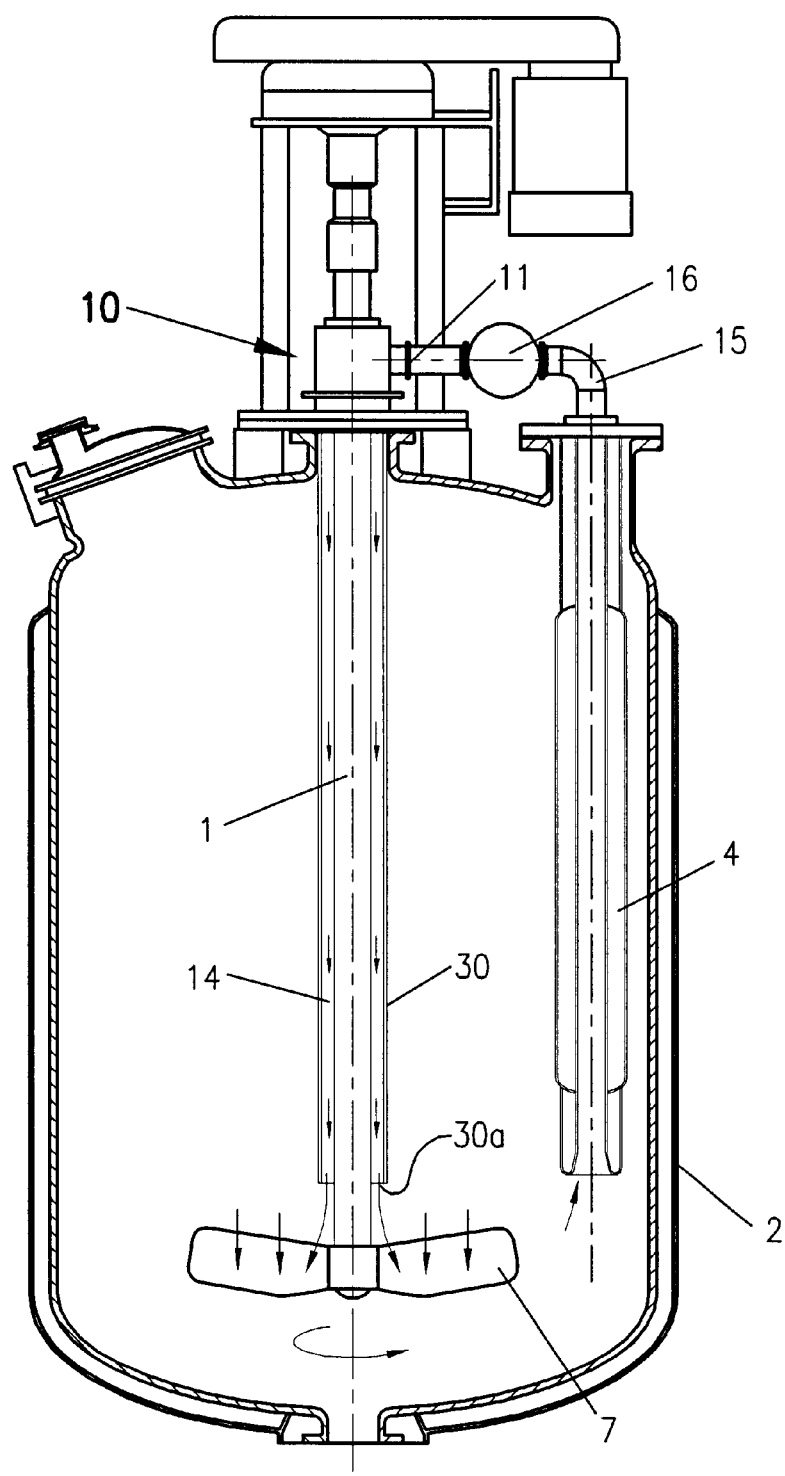
FIG. 4 illustrates a further embodiment of the charging assembly of the invention, in conjunction with a vessel, which allows for recirculation of processed medium.

Another embodiment of the charging assembly is shown in FIG. 4. The inlet port 11 of the adapter 10 is connected to a recirculation line 15. Recirculation line is arranged to remove product from the vessel. In the embodiment of FIG. 4, the recirculation line 15 is connected to a dip tube 4 arranged in the outer region of the vessel. When the feed tube 30 extends down close to the agitator 7, a suction is created within the annular space 14, which allows product to be drawn into the lower end of a dip tube 4 and to be returned to the vessel via the feed tube 30. Thus a closed circuit recirculation line can be established. In another embodiment, the charging assembly can comprise the recirculation line 15 as shown in FIG. 4, but without the feed tube 30. In this case, a pump 16 is provided in the recirculation line to achieve the desired product recirculation flow.

Further embodiments of the present charging assembly will now be discussed in conjunction with FIGS. 5a, 5b, 5c, 6a, 6b and 6c. When the assembly comprises a feed tube 30, the annular passage 14 can be provided with a transverse cross-sectional area which varies along the axial direction of the drive shaft 1. By altering the cross-sectional area, the flow velocity of the introduced product can be increased or decreased, where a positive influence on the mixing effect may be achieved. As shown in FIG. 5a, the interior surface of the feed tube 30 is provided with a recess 31, such that the cross-section of the annular passage 14 increases in the area in the recess. The sudden increase in the flow cross-section causes the introduced product to first decelerate and then to accelerate when leaving the enlarged cross-sectional area. As the arrows indicate in FIG. 5a, turbulence results in the region of the recess, which will produce a mixing effect. This embodiment is important for example when the adapter element 10 is provided with two inlet ports for introducing two separate and different ingredients.

In the embodiment of FIG. 5b, a projection is provided on the outer surface of the drive shaft, which then decreases the cross-sectional area of the annular passage 14. The reduced cross-sectional area between the projection 32 and the tube 30 causes the flow velocity to increase, whereafter the cross-section again increases. Flow turbulence is again generated which enhances the mixing effect.

Another embodiment is shown in FIG. 5c where a reduced cross-section and high flow velocity is achieved in an axial range d. In this case, the drive shaft is provided with a projection 32 and in addition the diameter of the feed tube 30 is reduced, i.e., is smaller than the diameter of the feed tube at its upper end. Beyond the extension range d of the projection 32 in flow direction, the feed tube 30 is again reduced in diameter. This creates a turbulence zone just downstream of the projection 32, which again enhances mixing in the case that two or more media are being introduced through the inlet ports 11 of the adapter 10.

As illustrated in FIGS. 6a, 6b and 6c, other types of flow control elements can also be attached to the drive shaft 1. In FIG. 6a, flow enhancing elements 33 are secured to the outer surface of the drive shaft 1 and project into the annular passage 14. The elements will normally be in the form of blades, which rotate with the rotary motion of the drive shaft 1. In FIG. 6a, two sets of flow enhancing elements are provided one above the other, the elements 33 being configured to increase the flow velocity downwardly in the annular passage 14 toward the agitator 7. It is also contemplated that deflection elements 35 may be attached to the interior wall of the feed tube 30 which are configured to deflect the inlet product flow in the region of acceleration caused by the flow enhancing elements 33. It is also possible to provide flow mixing or flow retardation elements 34 on the outer surface of the drive shaft 1 as is shown in FIG. 6b. In this configuration, the mixing elements would be configured so as to retard the downward flow of the inlet product in the annular passage 14. The mixing elements give the flow a component in the reverse direction, i.e., upwardly toward the inlet upper end of the feed tube 30. In effect the flow would be retarded and at the same time cause a mixing effect by the mixing elements 34. The embodiment in FIG. 6b shows a configuration in which the drive shaft comprises both a flow enhancing set of elements 33 and a set of flow mixing elements 34. The upstream enhancing elements 33 would increase flow velocity of the introduced product, and shortly thereafter the mixing elements 34 would tend to retard the input product. The intermediate region would again be subject to increased turbulence, which would be advantageous when two or more products are being introduced simultaneously.

Another advantageous embodiment is shown in FIG. 6c. A helical screw 36 is provided on the outer surface of the drive shaft, where the screw is configured to convey the introduced product to the lower end of the feed tube 30. This embodiment is particularly advantageous when the introduced product is not completely flowable, for example when the product is more viscous or in the form of a paste-like substance. The use of such a conveyor screw has the advantage of increasing the flexibility of the type of materials which can be introduced into the vessel.

Introduction of the product downwardly along the drive shaft leads to further advantageous configurations. As shown in FIGS. 7a, 7b and 8, various types of mixing elements may be mounted to the drive shaft. Such elements are preferably used in arrangements with the feed tube 30. FIGS. 7a and 7b illustrate a so-called diffuser element 40, which comprises radially extending ribs. The incoming product along the drive shaft receives a radial as well as a tangential flow component from the rotating diffuser. In this matter, the mixing or reaction process may be accelerated. The diffuser is positioned along the drive shaft in the region just above the agitator 7. In this manner, the introduced product received a radial acceleration into the zone of highest energy of the agitator, i.e., near the tips of the agitator blades. This is also the area of the highest axial flow velocity.

In another embodiment, such a diffuser can alternatively be employed in cleaning a vessel. For example, in the arrangement of FIG. 7a when the diffuser 40 is located in the upper portion of the vessel, cleaning fluid injected through the feed tube 30 can be radially accelerated by the diffuser to the internal side walls of the container. For cleaning purposes, the feed tube 30 is often not needed, where the configuration of FIG. 2 but with a diffuser is appropriate. To realize the cleaning effect, the diffuser can take on various shapes. For example, the diffuser can be designed to deflect the cleaning fluid to the upper ceiling of the vessel. The slide ring sealing of the drive shaft of the stirring mechanism can also be cleaned in this matter, i.e., a region which has been extremely difficult to clean in conventional vessels. In general, the shape of the diffuser can be adapted to direct the cleaning fluid to any desired area of the interior of the vessel. In the above-mentioned example, the downwardly entering cleaning fluid is redirected by the diffuser by greater than 90° to the interior ceiling of the vessel.

Another embodiment is shown in FIG. 8 in which the introduced product is supplied through the feed tube 30 in the downwards direction onto a so-called deflector element 50. The deflector element 50 is located just above the agitator 7. The deflector 50 is configured so as to impart on a radial flow component only. The diameter of the deflector is selected to be smaller than the diameter of the agitator 7 as defined by the radial extension of its blades. In this manner, the introduced product is deflected toward the end portion of the agitator blades where the energy for mixing is the highest.

The deflector 50 as well as the diffuser 40 mentioned above can be located at any position along the drive shaft. For example in some applications, it is advantageous to provide the deflector 50 above the fluid surface in the vessel, so as to distribute the introduced product on the fluid surface. In this embodiment, the deflector is preferably mounted on the drive shaft in the upper portion of the vessel.

The present invention also provides a reaction vessel which makes use of the charging assembly according to the embodiments described above. In one preferred arrangement of the mixing vessel, the charging assembly is disposed along the central vertical axis of the vessel, as shown for example in FIGS. 2, 3 and 4. In the vessel of the embodiment FIG. 4, the recirculation line 15 is connected to a dip tube 4 which is mounted vertically in the vessel 2. In this embodiment, the dip tube 4 which normally would function as a sample removing device, is connected to the recirculation line 15. The recirculation line passes the removed product to the inlet port 11 of the adapter 10, such that a closed-circuit circulation system is obtained. In this embodiment of the vessel of the present invention, the centrally located charging assembly may be provided with or without the feed tube 30. When provided with the feed tube 30, the suction force created by the agitator 7 at the outlet end 30a of the feed tube 30 is sufficient to draw the product into the dip tube 4. When the feed tube 30 is not present, a pump 16 is provided in the recirculation line 15 to achieve the reflux flow.

In a further embodiment, the charging assembly can be mounted in a port at the top of the vessel which is set apart from the center line of the vessel. The off-set or off-center arrangement makes it possible to eliminate the need for a disruption baffle, for example as shown in the conventional arrangement of FIG. 1. In this embodiment, the charging assembly would preferably be equipped with the feed tube 30, which itself would act as a disruption baffle. In the off-set configuration, the feed tube 30 also prevents the transverse forces of the circulating media from exerting a side load on the drive shaft of the stirring mechanism.

Figure 9:
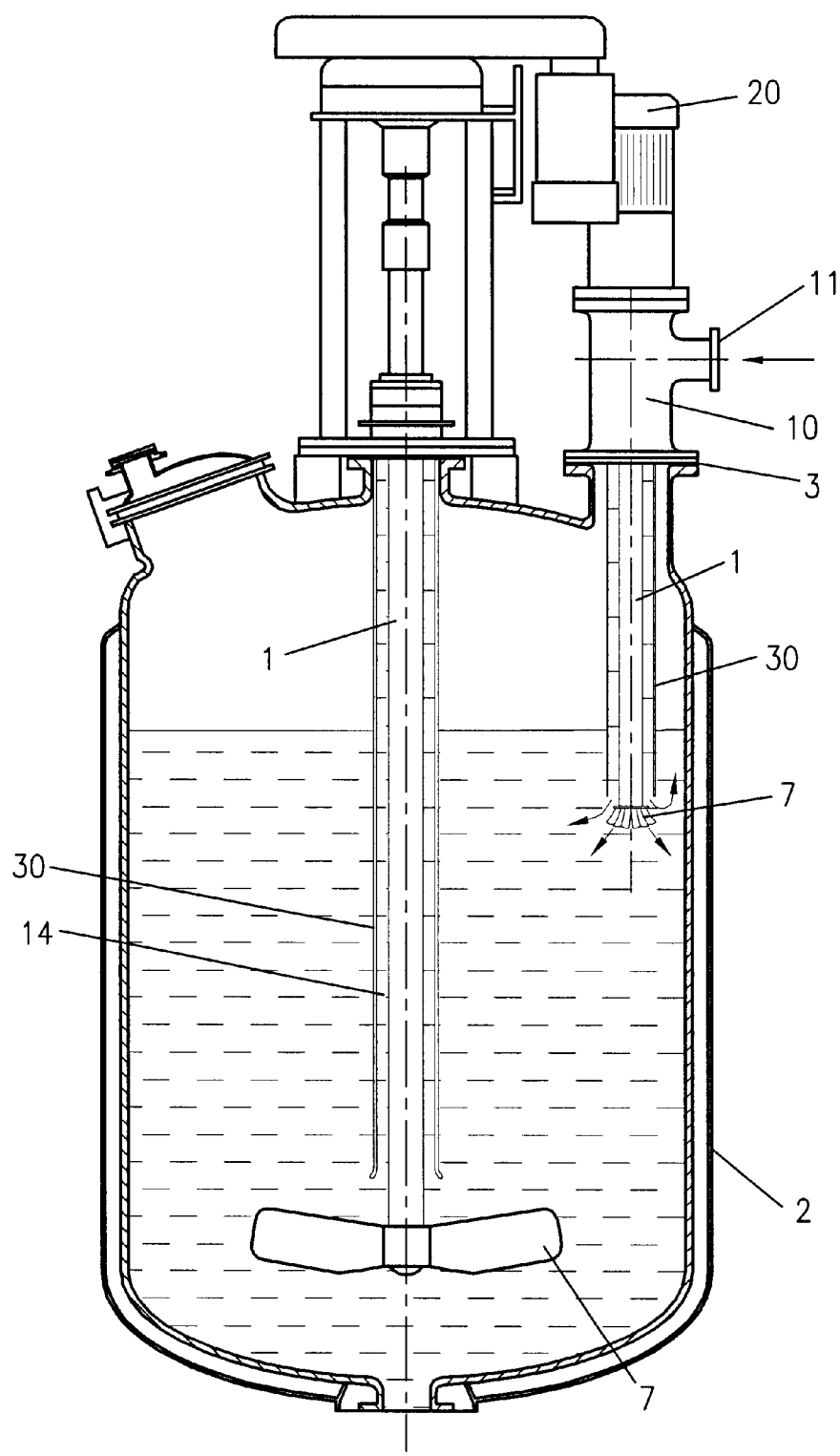
FIG. 9 illustrates an embodiment of the vessel according to the present invention, where the charging assembly is offset from a central stirring mechanism.

In another embodiment of the vessel according to the present invention as shown in FIG. 9, a conventional stirring mechanism is disposed centrally along the center line of the vessel 2. At an off-set position, the present charging assembly is mounted to a top vessel port 3 near the vessel side wall. In this embodiment, the charging assembly comprises a feed tube 30 and the agitator connected at the lower end of the drive shaft 1 is provided in the form of a diffuser 7. The conventional stirring mechanism can also be provided with a feed tube 30 extending around and along the drive shaft 1. In this case, local and intensive mixing is provided by the conventional agitator 7, whereas local product introduction is achieved by the charging assembly at the outer and upper region of the vessel. As can be taken from this embodiment, optimal mixing capability can be achieved as well as flexible arrangements for the introduction and mixing of ingredients, depending on the process requirements.

What is claimed is:

1. A charging assembly for introducing a product into a mixing vessel (2), comprising:

a) a stirring mechanism including a drive shaft (1) extending into the vessel through a top port (3) thereof, said top port (3) having a top port connecting flange, an agitator (7) connected to a lower end of the drive shaft (1) and driving means (20) connected to an upper end of the drive shaft (1), said driving means having a drive connecting surface surrounding drive shaft (1), said driving means (20) being disposed above top port (3) of the vessel (2), said drive shaft having an upper portion defined by the distance between the drive connecting surface and the top port (3); and b) an adapter element (10), having an internal surface between upper and lower ends of the adapter element, a top connecting surface proximate the upper end of the adapter element and a bottom connecting surface proximate the bottom end of the adapter element, said adapter element being connected between the driving means (20) and the top port (3) so that the top connecting surface of the adapter element (10) is connected to the drive connecting surface and the bottom connecting surface is connected to the port connecting flange so the adapter element completely surrounds upper portion (1a) of the drive shaft (1), the adapter element (10) having at least one inlet port (11) for introducing said product into an annular space (13) defined between the internal surface of the adapter element (10) and the drive shaft (1) and then into the vessel (2).

2. The charging assembly of claim 1, further comprising a feed tube (30) connected to the top port (3) and extending about and along the drive shaft (1) into the vessel (2) toward the agitator (7), wherein an annular passage (14), defined between the feed tube (30) and the drive shaft (1), is in fluid communication with the annular space (13) within said adapter element (10).

3. The charging assembly of claim 2, wherein the longitudinal axes of the feed tube (30) and the drive shaft (1) are off-set from one another.

4. The charging assembly of claim 2, wherein a lower outlet end (30a) of the feed tube (30) is located at a spaced distance above agitator (7).

5. The charging assembly of claim 2, wherein the inlet port (11) of the adapter element (10) is connected to a recirculation line (15).

6. The charging assembly of claim 2, wherein the cross-section of the annular passage (14) between the drive shaft (1) and the feed tube (30) varies in the axial direction of product flow.

7. The charging assembly of claim 6, wherein a recess (31) is formed in the interior of the feed tube (30) to increase the cross-section of the annular passage (14).

8. The charging assembly of claim 6, wherein a projection (32) is formed on the exterior of the drive shaft (1) to decrease the cross-section of the annular passage (14).

9. The charging assembly of claim 8, wherein the projection (32) has an axial extension (d) and the diameter of the feed tube (30) opposing the projection (32) in the axial extension is smaller than the diameter of the feed tube (30) at its upper end.

10. The charging assembly of claim 2, wherein flow enhancing elements (33) are provided on the outer surface of the drive shaft (1) which extend into the annular passage (14), the enhancing elements (33) configured to increase the downward flow in the annular passage (14) upon rotation of the drive shaft (1).

11. The charging assembly of claim 2, wherein flow mixing elements (34) are provided on the outer surface of the drive shaft (1) which extend into the annular passage (14), the flow mixing elements (34) configured to retard the downward flow velocity in the annular passage (14) upon rotation of the drive shaft (1).

12. The charging assembly of claim 11, wherein flow enhancing elements (33) are provided on the outer surface of the drive shaft (1) at a position upstream of the flow mixing elements (34), the flow enhancing elements (33) adapted to provide flow velocity increase of the introduced product prior to flow retardation caused by the flow mixing elements (34).

13. The charging assembly of claim 2, wherein a helical screw (36) is provided on the outer surface of the drive shaft (1), the helical screw (36) configured to convey the introduced product to the lower end (30a) of the feed tube (30) upon rotation of the drive shaft (1).

14. The charging assembly of claim 2, wherein a diffuser (40) is mounted on the drive shaft (1) above the agitator (7), the diffuser (40) being configured to impart a radial and tangential flow component to the product entering the vessel.

15. The charging assembly of claim 2, wherein a deflector (50) is mounted to the drive shaft (1) above the agitator (7), the deflector (40) being configured to impart a radial flow component to the product entering the vessel.

16. A mixing vessel comprising: a vessel body including said top port (3), and the charging assembly of claim 2.

17. The charging assembly of claim 1, wherein the inlet port (11) of the adapter element (10) is connected to a recirculation line (15).

18. The charging assembly of claim 17, wherein a pump (16) is provided in the recirculation line (15) and a dip tube (4) extending into the vessel is connected at its upper end to the recirculation line (15).

19. The charging assembly of claim 17, wherein the cross-section of the annular passage (14) between the drive shaft (1) and the feed tube (30) varies in the axial direction of product flow.

20. The charging assembly of claim 17, wherein flow enhancing elements (33) are provided on the outer surface of the drive shaft (1) which extend into the annular passage (14), the enhancing elements (33) configured to increase the downward flow in the annular passage (14) upon rotation of the drive shaft (1).

21. A mixing vessel comprising: a vessel body including said top port (3), and the charging assembly of claim 17.

22. The charging assembly of claim 1, wherein a diffuser (40) is mounted on the drive shaft (1) above the agitator (7), the diffuser (40) being configured to impart a radial and tangential flow component to the product entering the vessel.

23. The charging assembly of claim 1, wherein a deflector (50) is mounted to the drive shaft (1) above the agitator (7), the deflector (40) being configured to impart a radial flow component to the product entering the vessel.

24. A mixing vessel comprising: a vessel body including said top port (3), and the charging assembly of claim 1.

25. The mixing vessel of claim 24, wherein a vertical axis of the charging assembly is substantially coincident with a central vertical axis of the vessel (2).

26. The mixing vessel of claim 24, wherein the vertical axis of the charging assembly is off-set from the central vertical axis of the vessel (2).

27. The mixing vessel of claim 24, wherein a stirring mechanism is provided along the central vertical axis of the vessel (2) in addition to the off-set charging assembly.

28. The mixing vessel of claim 27, wherein a feed tube (30) is provided with the central stirring mechanism, the feed tube (30) extending about and along the drive shaft (1) into the vessel.

29. A method for introducing product into a mixing vessel which comprises introducing product into the inlet port of the charging assembly of claim 1 attached to said vessel.

* * * * *